United States Patent
Leppänen et al.

(10) Patent No.: US 10,796,485 B2
(45) Date of Patent: Oct. 6, 2020

(54) RENDERING OBJECTS IN VIRTUAL VIEWS

(71) Applicant: Nokia Technologies Oy, Espoo (FI)

(72) Inventors: Jussi Artturi Leppänen, Tampere (FI); Ari-Pekka Liljeroos, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/517,859

(22) Filed: Jul. 22, 2019

(65) Prior Publication Data

US 2020/0035023 A1   Jan. 30, 2020

(30) Foreign Application Priority Data

Jul. 26, 2018   (EP) .................................... 18185909

(51) Int. Cl.
  *G06T 19/00* (2011.01)
  *G06F 3/01* (2006.01)
  *G06T 15/20* (2011.01)

(52) U.S. Cl.
  CPC ............ *G06T 19/003* (2013.01); *G06F 3/011* (2013.01); *G06T 15/20* (2013.01); *G06T 19/006* (2013.01)

(58) Field of Classification Search
  CPC ..... G06T 15/20; G06T 19/006; G06T 19/003; G06F 3/011
  See application file for complete search history.

(56) References Cited

U.S. PATENT DOCUMENTS

| | | |
|---|---|---|
| 2010/0100851 A1 | 4/2010 | Clark et al. |
| 2013/0127980 A1* | 5/2013 | Haddick ................. G06F 3/013 348/14.08 |
| 2014/0320404 A1 | 10/2014 | Kasahara |
| 2015/0215611 A1 | 7/2015 | Wu et al. |
| 2015/0279103 A1 | 10/2015 | Naegle et al. |
| 2016/0189426 A1 | 6/2016 | Thomas et al. |
| 2016/0314622 A1 | 10/2016 | Davis et al. |

(Continued)

FOREIGN PATENT DOCUMENTS

WO   2017/176818 A1   10/2017

OTHER PUBLICATIONS

"'Project Alice' Tracks Real Objects to Enhance Multi-user VR Experiences", Road Tovr, Retrieved on Jul. 22, 2019, Webpage available at : https://www.roadtovr.com/project-alice-tracks-real-objects-to-enhance-multi-user-vr-experiences/.

(Continued)

*Primary Examiner* — Robert J Craddock
(74) *Attorney, Agent, or Firm* — Harrington & Smith

(57) ABSTRACT

An apparatus, method and computer program product are described, comprising: rendering a plurality of objects to a viewer of a scene in a first virtual view, wherein: at least one of said objects has a physical counterpart; at least one of said objects does not have a physical counterpart; and the scene is at least one of a virtual reality, augmented reality or mixed reality scene; receiving a first command; and rendering the objects in an alternative virtual view in response to the first command, wherein rendering the objects in the alternative virtual view comprises rendering the objects with a physical counterpart on a first two-dimensional level of the alternative virtual view and rendering at least one of the at least one objects without a physical counterpart on a second two-dimensional level of the alternative virtual view that is different two the first two-dimensional level.

20 Claims, 9 Drawing Sheets

(56) References Cited

U.S. PATENT DOCUMENTS

| | | |
|---|---|---|
| 2016/0379396 A1 | 12/2016 | Pandey et al. |
| 2017/0011558 A1 | 1/2017 | Meier et al. |
| 2017/0069134 A1 | 3/2017 | Shapira et al. |
| 2017/0232335 A1 | 8/2017 | Williams et al. |
| 2017/0358137 A1 | 12/2017 | Auten et al. |

OTHER PUBLICATIONS

"Augmented (hyper)Reality: Domestic Robocop", Youtube, Retrieved on Jul. 22, 2019, Webpage available at : https://www.youtube.com/watch?v=fSfKICmYcLc.

Extended European Search Report received for corresponding European Patent Application No. 18185909.1, dated Jan. 4, 2019, 12 pages.

\* cited by examiner

RENDERING OBJECTS IN VIRTUAL VIEWS

FIELD

The present specification relates to rendering objects in virtual views; for example, to rendering objects to a viewer of a virtual reality, augmented reality or mixed reality scene.

BACKGROUND

Virtual reality (VR) is a rapidly developing area of technology in which video content is provided to a VR display system. As is known, a VR display system may be provided with a live or stored feed from a video content source, the feed representing a VR space or world for immersive output through the display system. In some embodiments, audio is provided, which may be spatial audio. A VR headset may be configured to provide VR video and audio content to the viewer, e.g. through the use of a pair of video screens and headphones incorporated within the headset. Mixed reality (MR) is an area of technology in which real and virtual worlds are combined such that physical and digital objects co-exist and interact in real time. Augmented reality (AR) refers to a real-world view that is augmented by computer-generated sensory input. In the context of the present specification, the term "virtual reality" is intended to encompass augmented reality and mixed reality.

SUMMARY

In a first aspect, this specification describes an apparatus comprising at least one processor and at least one memory including computer program code, the at least one memory and the computer program code configured, with the at least one processor, to cause the apparatus at least to perform: rendering a plurality of objects to a viewer of a scene in a first virtual view, wherein: at least one of said objects has a physical counterpart; at least one of said objects does not have a physical counterpart; and the scene is at least one of a virtual reality, augmented reality or mixed reality scene; receiving a first command (e.g. from the viewer); and rendering the objects in an alternative virtual view in response to the first command, wherein rendering the objects in the alternative virtual view renders the objects with a physical counterpart on a first two-dimensional level of the alternative virtual view and renders at least one of the at least one objects without a physical counterpart on a second two-dimensional level of the alternative virtual view that is different to the first two-dimensional level. Objects rendered on the first two-dimensional level of the alternative view may be rendered at a first distance from the viewer and objects rendered on the second two-dimensional level of the alternative view may be rendered at a second distance from the viewer, wherein the second distance is different to the first distance.

The first two-dimensional level of the alternative virtual view may be rendered closer to the viewer than the second two-dimensional level of the alternative virtual view. Alternatively, the second two-dimensional level of the alternative virtual view may be rendered closer to the viewer than the first two-dimensional level of the alternative virtual view. In either case, background imagery of the scene may be presented on the two-dimensional level of the alternative virtual view that is rendered furthest away from the viewer. The apparatus may further comprise presenting representations of one or more (e.g. each) of the objects that have a physical counterpart between the first and second two-dimensional levels of the alternative virtual view. The representations may include camera-captured images and/or wire-frame models.

Rendering the plurality of objects may comprise rendering the objects with a physical counterpart in a position dependent on a real world position of the physical counterpart.

The first command may be a gesture. The gesture could be a viewer gesture, but this is not essential to all embodiments. For example, the gesture could be from another user.

In a second aspect, this specification describes a method comprising: rendering a plurality of objects to a viewer of a scene in a first virtual view, wherein: at least one of said objects has a physical counterpart; at least one of said objects does not have a physical counterpart; and the scene is at least one of a virtual reality, augmented reality or mixed reality scene; receiving a first command; and rendering the objects in an alternative virtual view in response to the first command, wherein rendering the objects in the alternative virtual view comprises rendering the objects with a physical counterpart on a first two-dimensional level of the alternative virtual view and rendering at least one of the at least one objects without a physical counterpart on a second two-dimensional level of the alternative virtual view that is different two the first two-dimensional level. Objects rendered on the first two-dimensional level of the alternative view may be rendered at a first distance from the viewer and objects rendered on the second two-dimensional level of the alternative view may be rendered at a second distance from the viewer, wherein the second distance is different to the first distance.

The first two-dimensional level of the alternative virtual view may be rendered closer to the viewer than the second two-dimensional level of the alternative virtual view. Alternatively, the second two-dimensional level of the alternative virtual view may be rendered closer to the viewer than the first two-dimensional level of the alternative virtual view. In either case, background imagery of the scene may be presented on the two-dimensional level of the alternative virtual view that is rendered furthest away from the viewer.

The method may further comprise presenting representations of one or more (e.g. each) of the objects that has a physical counterpart between the first and second two-dimensional levels of the alternative virtual view.

The first command may be received from the viewer.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions stored thereon for performing at least the following: rendering a plurality of objects to a viewer of a scene in a first virtual view, wherein: at least one of said objects has a physical counterpart; at least one of said objects does not have a physical counterpart; and the scene is at least one of a virtual reality, augmented reality or mixed reality scene; receiving a first command; and rendering the objects in an alternative virtual view in response to the first command, wherein rendering the objects in the alternative virtual view comprises rendering the objects with a physical counterpart on a first two-dimensional level of the alternative virtual view and rendering at least one of the at least one objects without a physical counterpart on a second two-dimensional level of the alternative virtual view that is different two the first two-dimensional level.

In a sixth aspect, this specification describes a computer-readable medium (e.g. a non-transitory computer-readable medium) comprising program instructions stored thereon for performing at least the following: rendering a plurality of objects to a viewer of a scene in a first virtual view, wherein: at least one of said objects has a physical counterpart; at least one of said objects does not have a physical counterpart; and the scene is at least one of a virtual reality, augmented reality or mixed reality scene; receiving a first command; and rendering the objects in an alternative virtual view in response to the first command, wherein rendering the objects in the alternative virtual view comprises rendering the objects with a physical counterpart on a first two-dimensional level of the alternative virtual view and rendering at least one of the at least one objects without a physical counterpart on a second two-dimensional level of the alternative virtual view that is different two the first two-dimensional level.

BRIEF DESCRIPTION OF THE DRAWINGS

Example embodiments will now be described, by way of example only, with reference to the following schematic drawings, in which.

DETAILED DESCRIPTION

Figure 1:
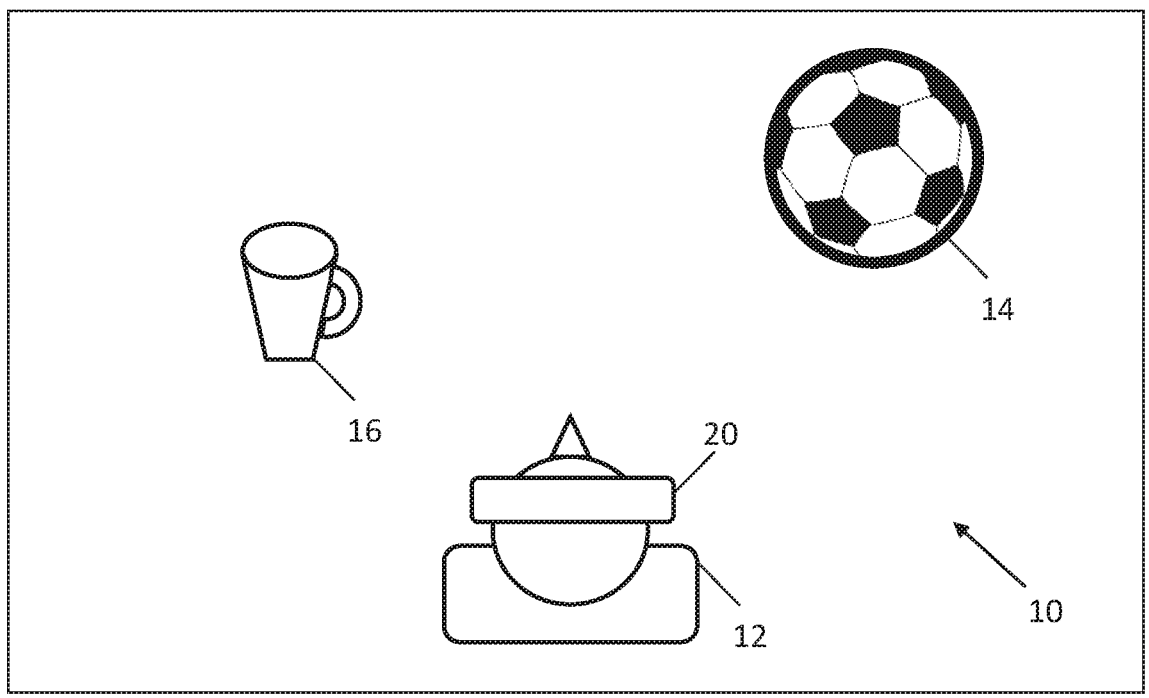
FIG. 1 is a block diagram of a system in accordance with an example embodiment.

FIG. 1 is a block diagram of a system, indicated generally by the reference numeral 10, in accordance with an example embodiment. System 10 illustrates a real-world environment of a viewer 12 comprising physical objects, such as ball 14 and cup 16. Viewer 12 may wear a virtual reality headset 20 for displaying visual data for a virtual reality scene. Ball 14 and cup 16 are real physical objects that are present in the real-world environment of the viewer 12.

Figure 2:
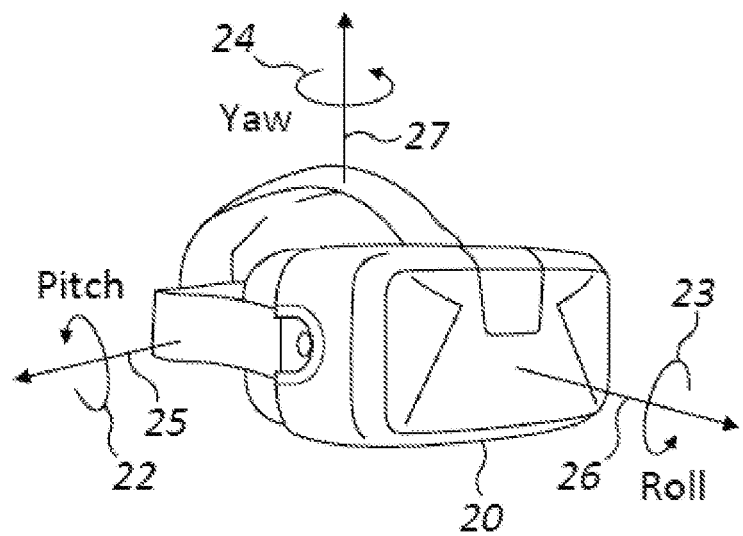
FIG. 2 shows a virtual reality headset.

FIG. 2 shows a virtual reality headset 20, as described in system 10. The headset 20 may comprise augmented reality (AR) glasses, which may enable visual content, for example one or more virtual objects, to be projected or displayed on top of a see-through portion of the glasses.

The headset 20 receives the virtual reality or augmented reality content data, for example from a media player (not shown). Here, the media player may comprise a mobile phone, smartphone or tablet computer configured to play content through its display. For example, the media player may be a touchscreen device having a large display over a major surface of the device, through which video content can be displayed. The media player may be inserted into a holder of a headset 20. With such headsets 20, a smart phone or tablet computer may display visual data which is provided to a viewer's eyes via respective lenses in the headset 20. The visual data may be provided as a stereoscopic display where the two slightly different angles of the visual scene are displayed to each eye.

The headset 20 may include means for determining the spatial position of the viewer and/or orientation of the viewer's head. This may be by means of determining the spatial position and/or orientation of the headset 20. Over successive time frames, a measure of movement may therefore be calculated and stored. For example, the headset 20 may incorporate motion tracking sensors which may include one or more of gyroscopes, accelerometers and structured light systems. These sensors may generate position data from which a current visual field-of-view (FOV) is determined and updated as the viewer, and so the headset 20, changes position and/or orientation. The headset 20 may comprise two digital screens for displaying stereoscopic video images of the virtual world in front of respective eyes of the viewer, and also two speakers for delivering audio, if provided. The example embodiments herein are not limited to a particular type of headset 20.

In some example embodiments, the spatial position and/or orientation of the viewer's head may be determined using a six degrees of freedom (6DoF) method. As shown in FIG. 2, these include measurements of pitch 22, roll 23 and yaw 24 and also translational movement in Euclidean space along side-to-side, front-to-back and up-and-down axes 25, 26 and 27. (The use of a six-degrees of freedom headset is not essential. For example, a three-degrees of freedom headset could readily be used.)

The headset 20 may be configured to display virtual reality, mixed reality or augmented reality content data to the viewer based on spatial position and/or the orientation of the headset 20. A detected change in spatial position and/or orientation, i.e. a form of movement, may result in a corresponding change in the visual data to reflect a position or orientation transformation of the viewer with reference to the space into which the visual data is projected. This allows virtual reality content data to be consumed with the viewer experiencing a 3D virtual reality or augmented reality environment.

Figure 3:
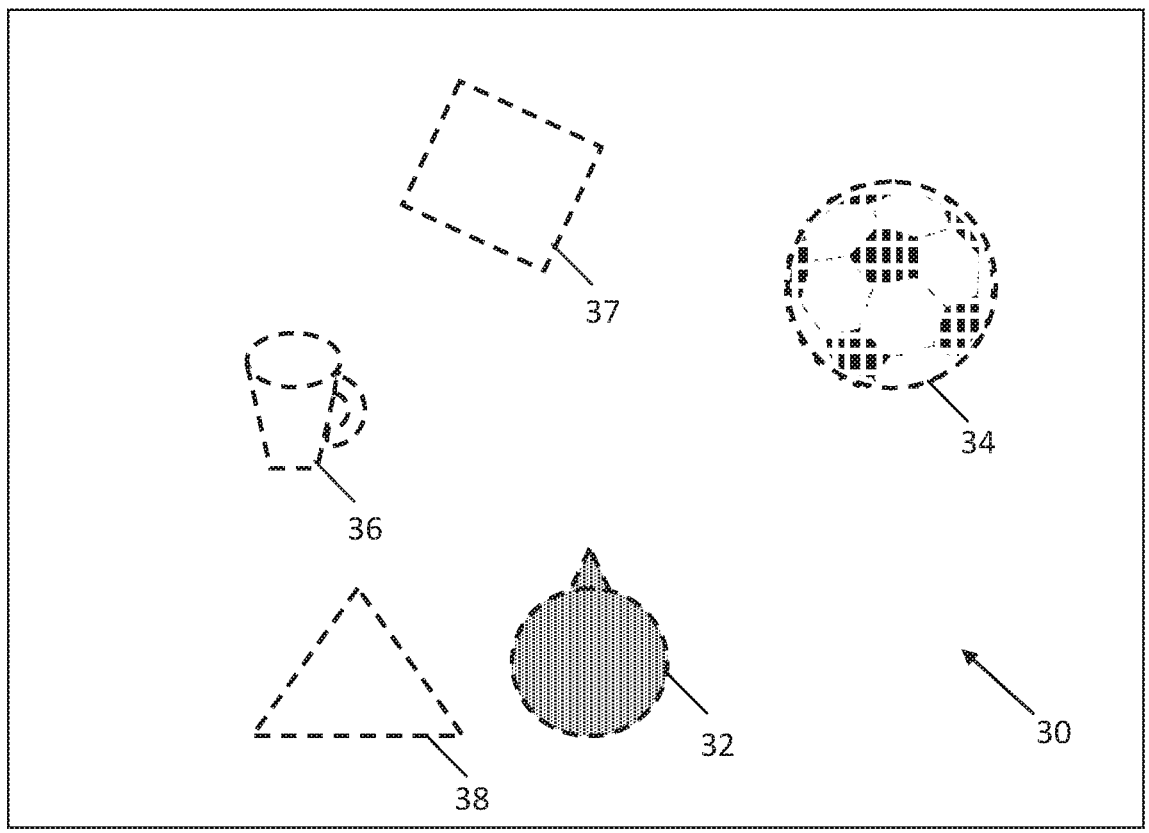
FIG. 3 shows an example rendering of a virtual reality scene.

FIG. 3 shows an example rendering of a virtual reality scene, indicated generally by the reference numeral 30. The virtual reality scene 30 may comprise a plurality of objects that are rendered to the viewer 12 in a virtual environment, as seen from a top view. The scene 30 as shown in FIG. 3 includes a representation 32 of the viewer 12 and shows the rendered positions of objects relative to the viewer. Thus, the scene 30 is provided for ease of understanding and explanation and is not the view as seen by the viewer 12. The same comments apply to the scenes 50, 70a, 70b and 80 described below with reference to FIGS. 5, 7A, 7B and 8.

The plurality of objects in the virtual reality scene 30 comprises the representation 32 of the viewer 12 described above, virtual ball 34, virtual cup 36, virtual object 37, and virtual object 38. Virtual ball 34 and virtual cup 36 are virtual representations of the ball 14 and the cup 16, which are physical objects present in the real-world environment. As such, the ball 14 and the cup 16 described above are physical counterparts of the virtual ball 34 and the virtual cup 36 respectively. Virtual objects 37 and 38 do not have any physical counterparts in the real environment.

The rendered positions of the objects that have a physical counterpart depend on a real world positions of the physical counterpart. For example, positions of virtual ball 34 and virtual cup 36 may be determined based on real world positions of ball 14 and cup 16 respectively (for example, the real world objects could be rendered in the virtual reality scenes using a camera feed, with the real world positions being calculated accordingly). Thus, the rendered positions of the virtual ball and the virtual cup move in response to movements of the ball 14 and cup 16 relative to the viewer 12 (which movement could be due to a movement of the object(s) and/or a movement or change in viewing direction of the viewer). Similarly, the rendered positions of the virtual objects 37 and 38 may move in response to movement of the virtual objects relative to the viewer in the virtual reality scene.

In the virtual reality scene 30, all rendered objects may be viewed as virtual objects, and it may not be apparent whether or not the virtual objects have physical counterparts.

In an example embodiment, in order to render the virtual reality scene, similar to virtual reality scene 30, tracking is performed for the positions of the viewer and the positions of the physical objects that are physical counterparts for virtual objects. In one example, visual tracking is performed using cameras mounted around the scene and on a virtual reality headset, similar to headset 20. In another example, tracking is performed by using several beacons with light emitting diode (LED) flash lights in the viewer's environment. The virtual reality headset detects the beacons in order to obtain the position of the viewer relative to the positions of the physical objects. In this example, headset 20 may be a HTC VIVE™ headset comprising a HTC VIVE™ tracker. The skilled person will be aware of many alternative arrangements for tracking the viewer and the physical objects.

Figure 4:
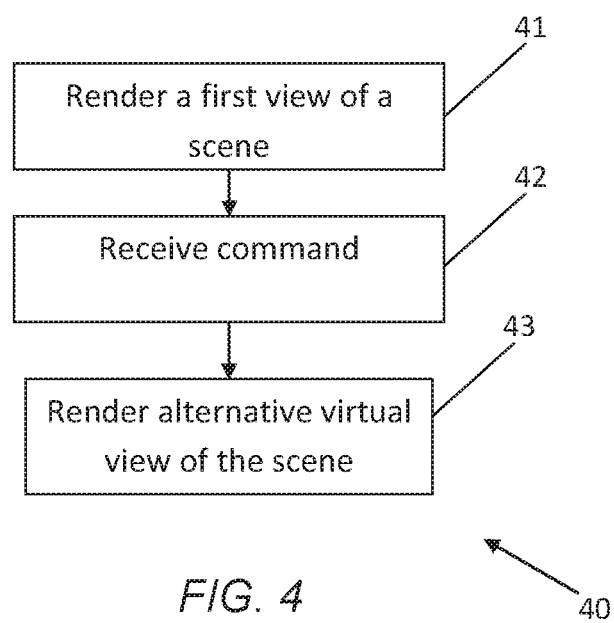
FIG. 4 is a flow chart showing an algorithm in accordance with an example embodiment.

FIG. 4 is a flow chart showing an algorithm, indicated generally by the reference numeral 40, in accordance with an example embodiment. At operation 41, a first view of a scene, such as virtual reality scene 30, is rendered to a viewer 12. At operation 42, a command is received (for example, from the viewer 12, although the command could be received from some other user). At operation 43, an alternative virtual view of the scene is rendered to the viewer in response to the command. The alternative virtual view is discussed further below with reference to FIGS. 5, 6, 7A and 7B.

In one example, the command may be sent by the relevant user (e.g. the viewer 12) using a gesture, a sequence of gestures, a specific button, movement, or sequence of buttons and/or movements on a controller, an audio input, or the like. The gestures may include, but are not limited to, hand gestures, eye movements, body movements, or the like. The command may be sent in order to enable the viewer 12 to view an alternative virtual view which may illustrate which virtual objects have physical counterparts and which virtual objects do not have physical counterparts.

Figure 5:
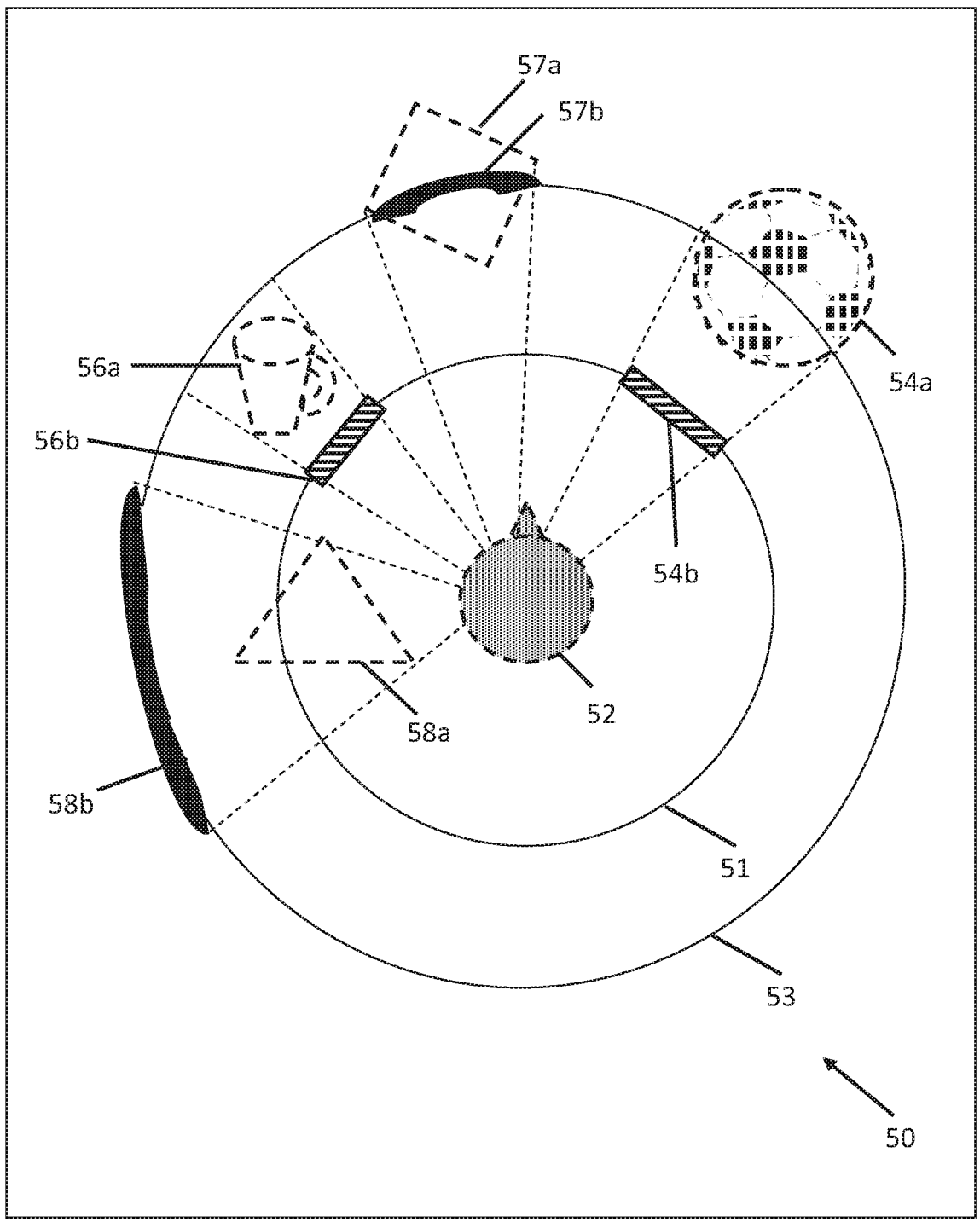
FIG. 5 shows a virtual reality scene rendered in accordance with an example embodiment.

FIG. 5 shows an example rendering of a virtual reality scene, indicated generally by the reference numeral 50, in accordance with an example embodiment. Virtual reality scene 50 comprises representation 52 of viewer 12, virtual ball 54a, virtual cup 56a, virtual object 57a, and virtual object 58a. Virtual reality scene 50 further comprises an illustration of an alternative virtual view, as provided at operation 43 of algorithm 40. The alternative virtual view comprises virtual object views, including: virtual ball view 54b, which is an alternative virtual view of virtual ball 54a; virtual cup view 56b, which is an alternative virtual view of virtual cup 56a; virtual object view 57b, which is an alternative virtual view of virtual object 57a; and virtual object view 58b, which is an alternative virtual view of virtual object 58a. The alternative virtual view may provide virtual object views in a first two-dimensional level 51 and/or a second two-dimensional level 53. The virtual ball view 54b and virtual cup view 56b are rendered in the first two-dimensional level 51, and the virtual object views 57b and 58b are rendered in the second two-dimensional level 53.

The first and second two-dimensional levels 51 and 53 are formed around the viewer, such that the viewer is able to view representations of virtual objects in different two-dimensional levels. For example, the first and second two-dimensional levels may be radial levels, such that virtual views formed on the first two-dimensional level 51 are rendered at a first distance from the viewer and virtual views formed on the second two-dimensional level 53 are rendered at a second distance from the viewer, different to the first distance. Thus, virtual views may be expressed using radial or polar co-ordinates comprising a distance for the viewer (i.e. the distance of the particular level) and an angle relative to the viewer.

For illustration purpose, views rendered in the first two-dimensional level 51 may appear to be nearer to the viewer relative to views rendered in the second two-dimensional level 53. Virtual ball view 54b may be a projection (e.g. a two-dimensional projection) of the virtual ball 54a on the first two-dimensional level 51. Similarly, virtual cup view 56b may be a projection (e.g. a two-dimensional projection) of the virtual cup 56a on the first two-dimensional level 51. Virtual object view 57b may be a projection (e.g. a two-dimensional projection) of the virtual object 57a on the second two-dimensional level 53. Similarly, virtual object view 58b may be a projection (e.g. a two-dimensional projection) of the virtual object 58a on the second two-dimensional level 53. As such, virtual ball view 54b and virtual cup view 56b may appear to be nearer to the viewer relative to virtual object views 57b and 58b. The viewer may then determine that the virtual ball view 54b and the virtual cup view 56b have physical counterparts (ball 14 and cup 16), while virtual object views 57b and 58b do not have physical counterparts. Virtual reality scene 50 illustrates how the projections may be obtained with projection lines. However, this is for illustration purposes only, such that the projection lines may not be displayed to the viewer. There may, for example, be a transition period during which the virtual ball 54a, virtual cup 56a, virtual object 57a, and virtual object 58a, virtual ball view 54b and virtual cup view 56b, virtual object view 57b and virtual object view 58b are all visible at the same time. Alternatively, the virtual ball 54a, virtual cup 56a, virtual object 57a and virtual object 58a may be gradually moved, in the scene 50, to the positions of the virtual ball view 54b, the virtual cup view 56b, the virtual object view 57b and the virtual object view 58b. These transitions are provided by way of example only. The skilled person will be aware of alternative possible implementations.

Figure 6:
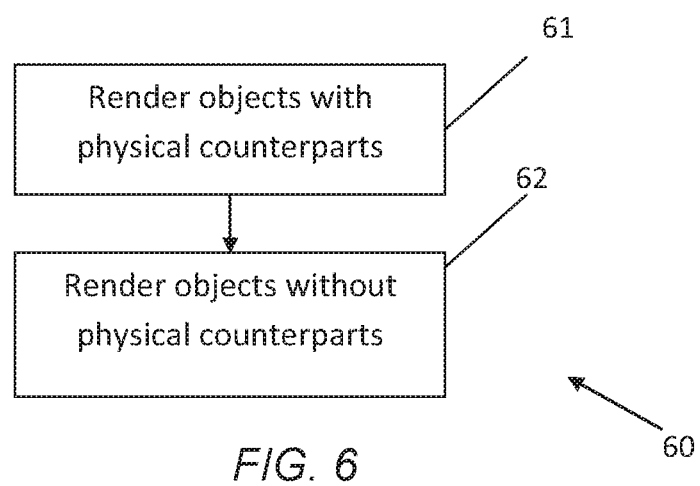
FIG. 6 is a flow chart showing an algorithm in accordance with an example embodiment.

FIG. 6 is a flow chart showing an algorithm, indicated generally by the reference numeral 60, in accordance with an example embodiment. At operation 61, objects with physical counterparts are rendered to the viewer, similar to viewer 52. At operation 62, objects without physical counterparts are rendered to the viewer. Viewing in conjunction with FIG. 5, at operation 61, virtual ball view 54*b* and virtual cup view 56*b* are rendered in the first two-dimensional level 51, as the virtual ball view 54*b* and virtual cup view 56*b* have physical counterparts (ball 14 and cup 16). At operation 62, virtual object views 57*b* and 58*b* are rendered in the second two-dimensional level 53, as the virtual object views 57*b* and 58*b* do not have physical counterparts. As discussed above, the first and second two-dimensional levels may have difference distances from the viewer, with virtual object views being provided at various angles relative to the viewer on the respective two-dimensional level.

Figure 7A:
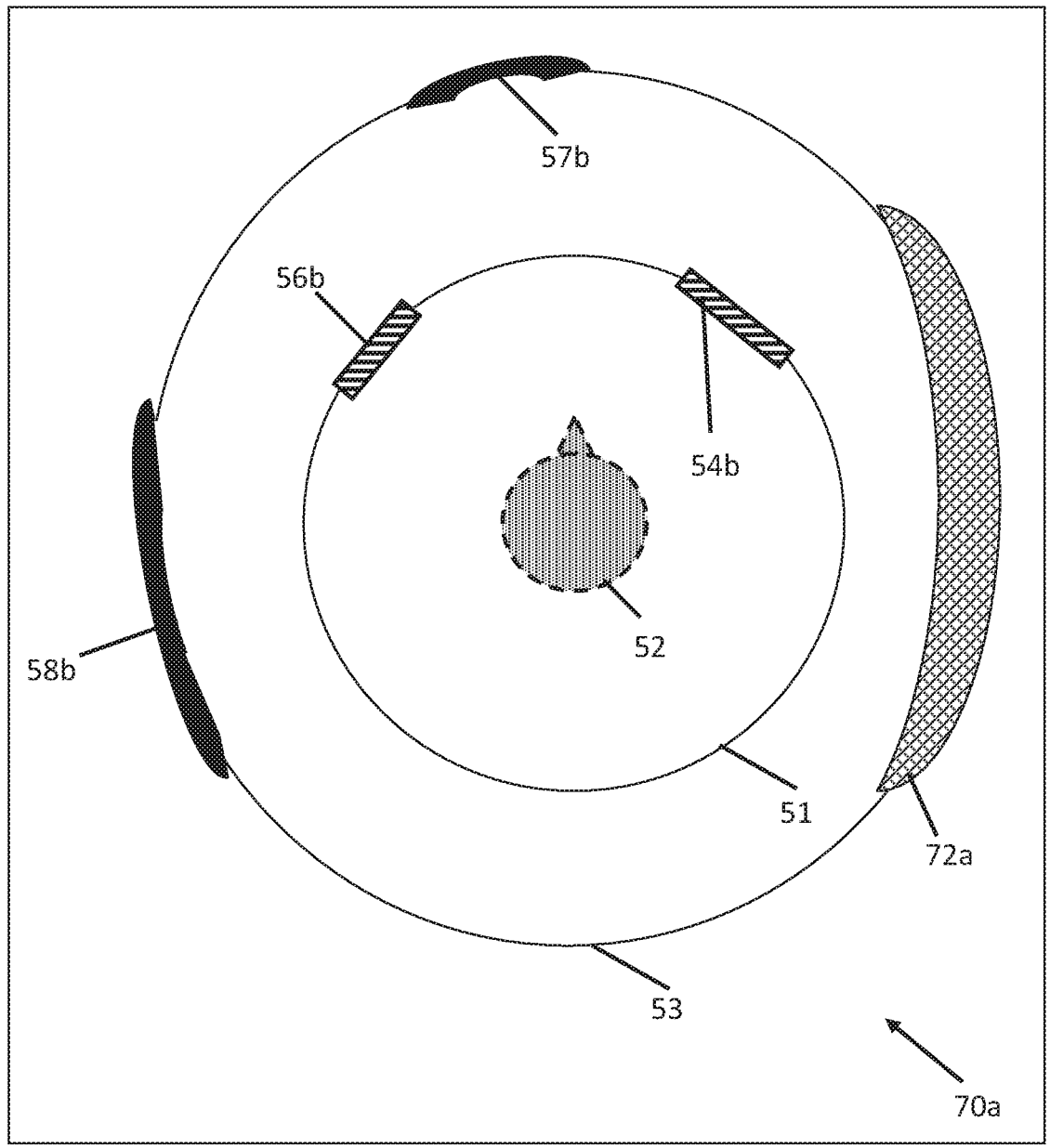
FIG. 7A shows a virtual reality scene rendered in accordance with an example embodiment.

FIG. 7A shows a virtual reality scene, indicated generally by reference numeral 70*a*, rendered in accordance with an example embodiment. Virtual reality scene 70*a* illustrates an alternative virtual view, as rendered using algorithm 60. Virtual reality scene 70*a* comprises virtual ball view 54*b* and virtual cup view 56*b* rendered on the first two-dimensional level 51 (with the virtual ball view and the virtual cup view being provided at different angles relative to the viewer on the first two-dimensional level), and also comprises virtual object views 57*b* and 58*b* rendered on the second two-dimensional level 53 (with the virtual object views being provided at different angles relative to the viewer on the second two-dimensional level). (FIG. 7A differs from FIG. 5 in that FIG. 5 shows how the alternative virtual views are created based on the virtual objects and FIG. 7A shows only the alternative virtual view of the scene as rendered at operation 43 of algorithm 40.)

In one example, background imagery of the virtual reality scene (e.g. the setting in which the objects such as the virtual ball, virtual cup and other virtual objects appear), such as background imagery 72*a*, is also rendered on the second two-dimensional level 53. Alternatively, such background imagery could be rendered three-dimensionally, but with all parts of the background imagery at or beyond the second two-dimensional level 53, such that no parts of the background imagery is rendered closer to the viewer 52 than any of the virtual objects 54*b*, 56*b*, 57*b* and 58*b*. It is possible that parts of so-called background imagery that are initially closer to the viewer than the second two-dimensional level 53 are rendered at, or beyond, the second two-dimensional level 53.

Figure 7B:
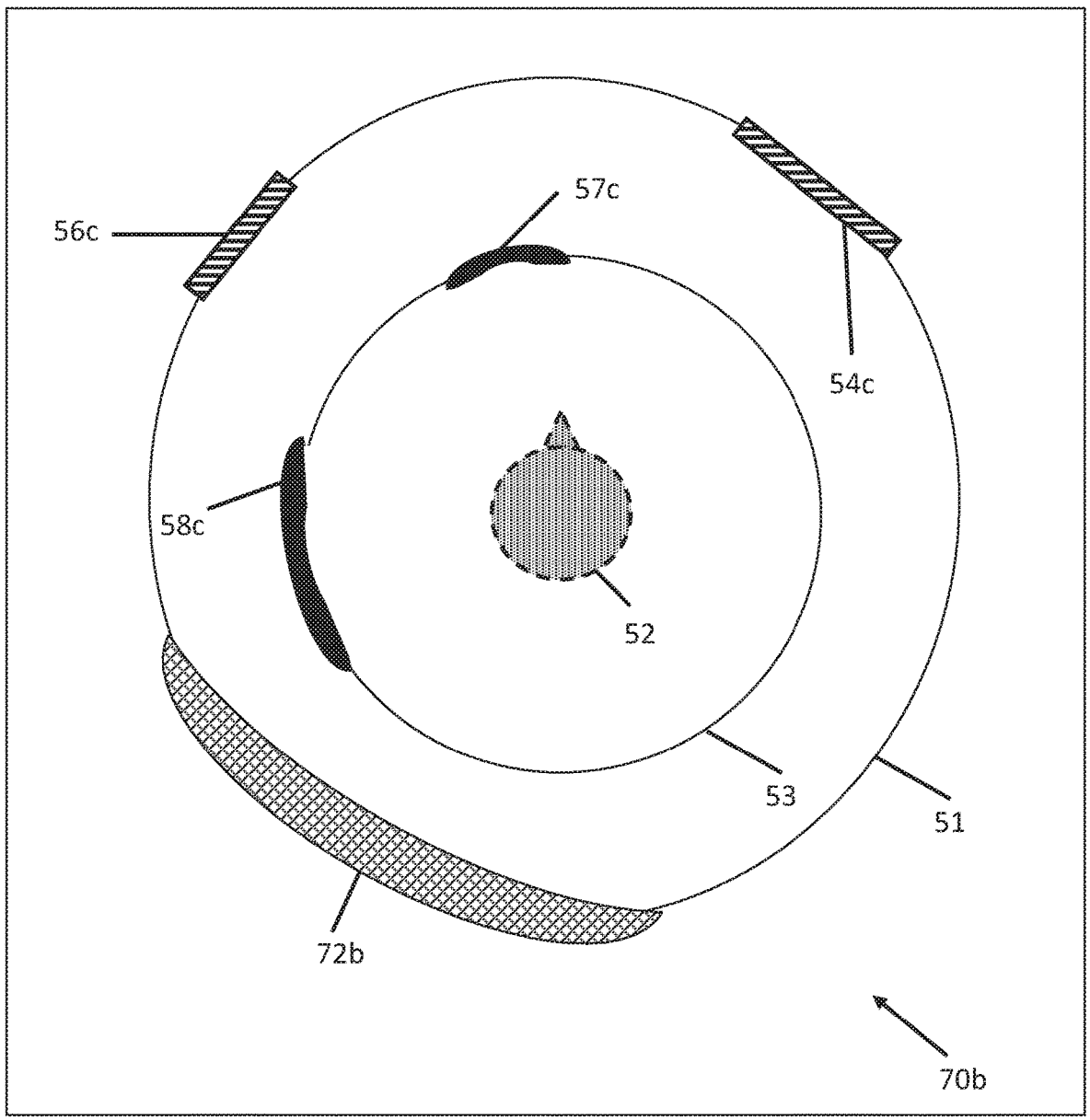
FIG. 7B shows a virtual reality scene rendered in accordance with an example embodiment.

FIG. 7B shows a virtual reality scene, indicated generally by reference numeral 70*b*, rendered in accordance with an example embodiment. Virtual reality scene 70*b* illustrates an alternative virtual view, as rendered using algorithm 60. Virtual reality scene 70*b* shows the second two-dimensional level 53 being rendered closer to the viewer relative to the first two-dimensional level 51. Virtual reality scene 70*b* comprises virtual ball view 54*c* and virtual cup view 56*c* rendered on the first two-dimensional level 51, and also comprises virtual object views 57*c* and 58*c* rendered on the second two-dimensional level 53. Virtual reality scene 70*b* may optionally comprise background imagery 72*b* rendered on the first two-dimensional level 51.

Figure 8:
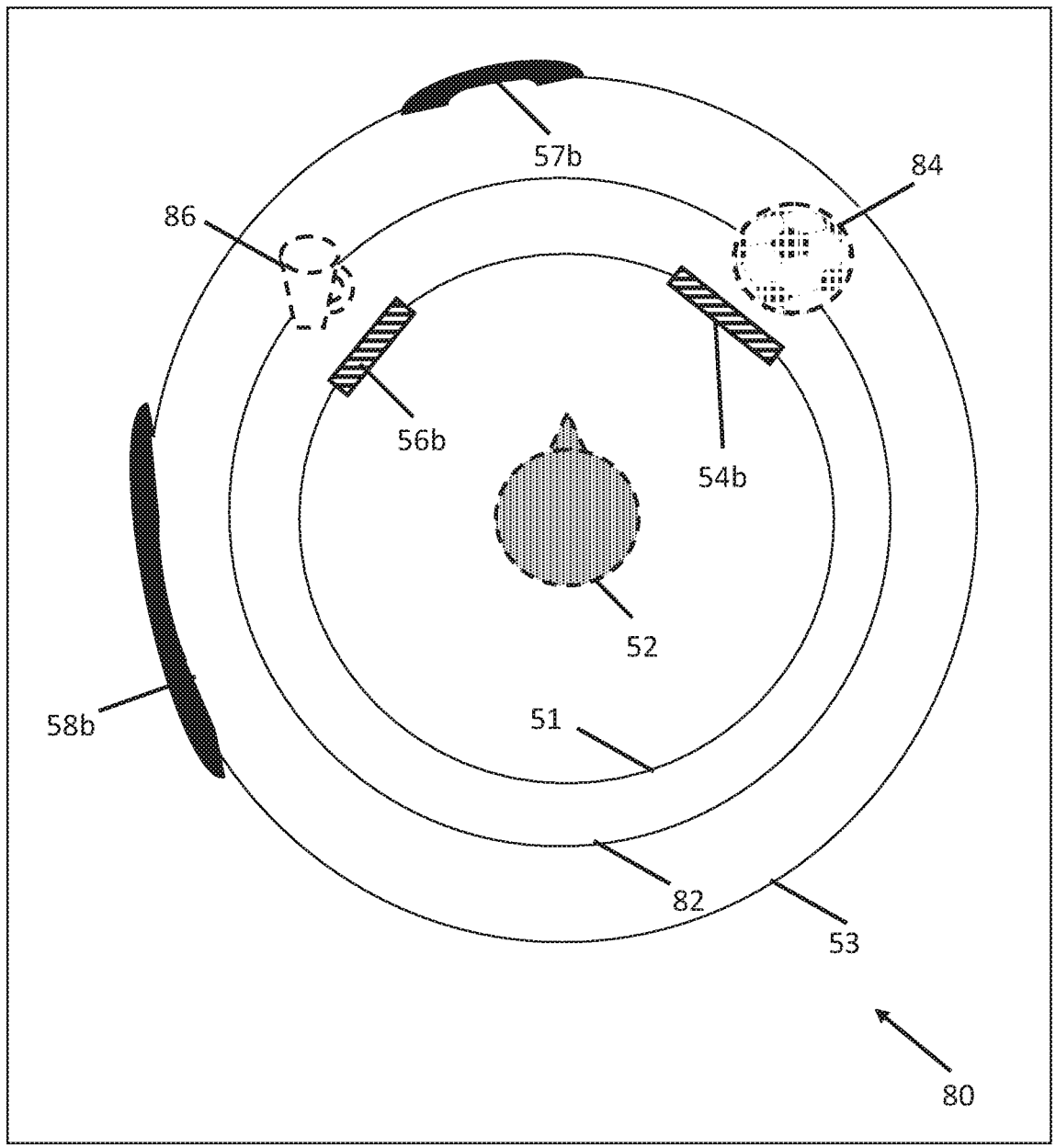
FIG. 8 shows a virtual reality scene rendered in accordance with an example embodiment.

FIG. 8 shows a virtual reality scene, indicated generally by reference numeral 80, rendered in accordance with an example embodiment. Virtual reality scene 80 comprises a third two-dimensional level 82. The third two-dimensional level 82 comprises representations of each object having a physical counterpart. For example, as discussed earlier, virtual ball view 54*b* and virtual cup view 56*b* have physical counterparts, and therefore corresponding representations 84 and 86 are provided in the third two-dimensional level respectively. As virtual object views 57*b* and 58*b* do not have physical counterparts, no representations corresponding to virtual object views 57*b* and 58*b* are provided in the third two-dimensional level. In one example, the representations 84 and 86 comprise camera-captured images of ball 14 and cup 16 respectively. In another example, the representations 84 and 86 comprise wire-frame models of ball 14 and cup 16 respectively. The wire-frame models may be based on a scanning of the real environment of the user and/or the physical objects.

The example embodiment in FIG. 7A shows that the first two-dimensional level 51 is nearer to the viewer relative to the second two-dimensional level 53. The example embodiment in FIG. 8 shows that the first two-dimensional level is nearest to the viewer, the third two-dimensional level 82 is in between first and second two-dimensional levels 51 and 53, and the second two-dimensional level 53 is farthest from the viewer. However, it will be appreciated that the ordering of the levels may be different from that illustrated in FIG. 7A and FIG. 8. For example, the second two-dimensional level 53 may be nearer to the viewer relative to the first two dimensional level 51, as shown in FIG. 7B. In another example, the third two-dimensional level 82 may not be between the first and second two-dimensional levels 51 and 53, and may be nearest to the viewer or farthest from the viewer.

The virtual ball view 54*b* and virtual cup view 56*b* that are projected on the first two-dimensional level 51 in the example embodiments described above may be two-dimensional representations of the ball 14 and cup 16. However, this is not essential to all embodiments. For example, the virtual ball view 54*b* and/or the virtual cup view 56*b* may be three-dimensional views that are located on the first two-dimensional level 51.

Figure 9:
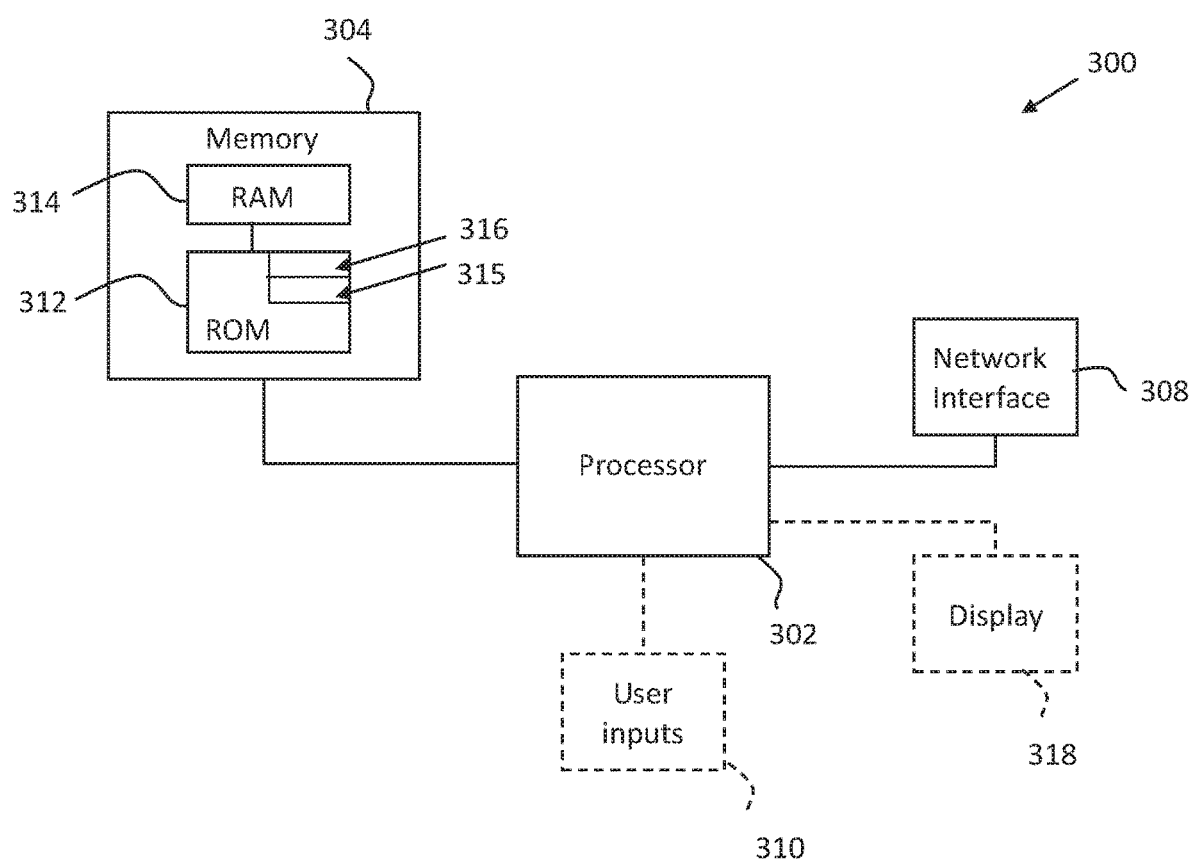
FIG. 9 is a block diagram of components of a system in accordance with an exemplary embodiment.

For completeness, FIG. 9 is a schematic diagram of components of one or more of the modules for implementing the algorithms described above, which hereafter are referred to generically as processing systems 300. A processing system 300 may have a processor 302, a memory 304 coupled to the processor and comprised of a RAM 314 and ROM 312, and, optionally, viewer inputs 310 and a display 318. The processing system 300 may comprise one or more network interfaces 308 for connection to a network, e.g. a modem which may be wired or wireless.

The processor 302 is connected to each of the other components in order to control operation thereof.

The memory 304 may comprise a non-volatile memory, a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor, implements aspects of the algorithms 40 and 60.

The processor 302 may take any suitable form. For instance, it may be a microcontroller, plural microcontrollers, a processor, or plural processors. Processor 302 may comprise processor circuitry.

The processing system 300 may be a standalone computer, a server, a console, or a network thereof.

In some embodiments, the processing system 300 may also be associated with external software applications. These may be applications stored on a remote server device and may run partly or exclusively on the remote server device. These applications may be termed cloud-hosted applications. The processing system 300 may be in communication with the remote server device in order to utilize the software application stored there.

Figure 10A:
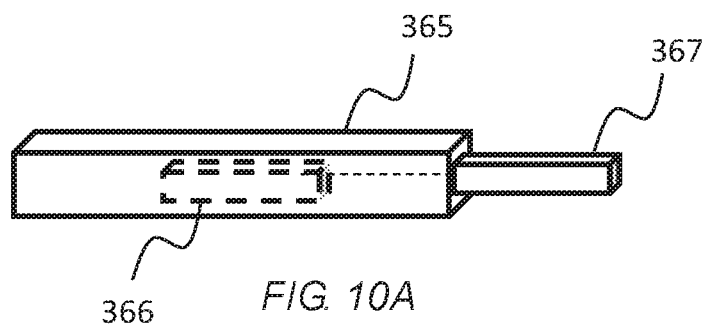
FIGS. 10A and 10B show tangible media, respectively a removable non-volatile memory unit and a compact disc (CD) storing computer-readable code which when run by a computer perform operations according to embodiments.
Figure 10B:
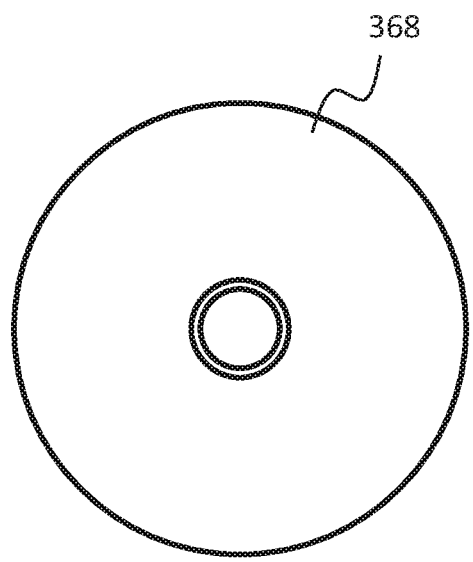

FIG. 10a and FIG. 10b show tangible media, respectively a removable memory unit 365 and a compact disc (CD) 368, storing computer-readable code which when run by a computer may perform methods according to embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagram of FIGS. 4 and 6 is an example only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
 at least one processor; and
 at least one non-transitory memory including computer program code;
 the at least one memory and the computer program code configured, with the at least one processor, to cause the apparatus at least to perform:
  rendering a plurality of objects to a viewer of a scene in a first virtual view, wherein: at least one of said plurality of objects has a physical counterpart; at least one of said plurality of objects does not have a physical counterpart; and the scene is at least one of a virtual reality, augmented reality or mixed reality scene;
  receiving a first command to transition from the first virtual view to an alternative virtual view, wherein the transition is configured to indicate which of the plurality of objects have a physical counterpart and which do not have a physical counterpart; and
  rendering the plurality of objects in the alternative virtual view in response to the first command, wherein rendering the plurality of objects in the alternative virtual view renders at least one of the at least one object with a physical counterpart on a first two-dimensional level of the alternative virtual view and renders at least one of the at least one object without a physical counterpart on a second two-dimensional level of the alternative virtual view that is different to the first two-dimensional level.

2. An apparatus as claimed in claim 1, wherein the first two-dimensional level of the alternative virtual view is rendered closer to the viewer than the second two-dimensional level of the alternative virtual view.

3. An apparatus as claimed in claim 1, wherein the second two-dimensional level of the alternative virtual view is rendered closer to the viewer than the first two-dimensional level of the alternative virtual view.

4. An apparatus as claimed in claim 2, wherein the at least one memory and the computer program code are further configured, with the at least one processor, to cause the apparatus to perform:
 presenting background imagery of the scene on a two-dimensional level of the alternative virtual view that is rendered furthest away from the viewer.

5. An apparatus as claimed in claim 3, wherein the at least one memory and the computer program code are further configured, with the at least one processor, to cause the apparatus to perform:

presenting background imagery of the scene on a two-dimensional level of the alternative virtual view that is rendered furthest away from the viewer.

6. An apparatus as claimed in claim 1, wherein the at least one memory and the computer program code are further configured, with the at least one processor, to cause the apparatus to perform:
presenting respective representations of one or more of the at least one object that has a physical counterpart between the first and second two-dimensional levels of the alternative virtual view.

7. An apparatus as claimed in claim 6, wherein the representations include camera-captured images and/or wire-frame models.

8. An apparatus as claimed in claim 1, wherein the first command is received from the viewer, further comprising:
determining at least one first object has a physical counterpart and at least one second object does not have a physical counterpart, wherein the rendering of the plurality of objects in the alternative virtual view renders the at least one first object on the first two-dimensional level of the alternative virtual view and renders the at least one second object on the second two-dimensional level of the alternative virtual view.

9. An apparatus as claimed in claim 1, wherein the plurality of objects comprises a plurality of virtual objects, wherein rendering the plurality of objects comprises rendering the at least one object with a physical counterpart in a position dependent on a real world position of a respective physical counterpart.

10. An apparatus as claimed in claim 1, wherein the first command is a gesture.

11. An apparatus as claimed in claim 1, wherein the at least one object rendered on the first two-dimensional level of the alternative view is rendered at a first distance from the viewer and the at least one object rendered on the second two-dimensional level of the alternative view is rendered at a second distance from the viewer, wherein the second distance is different to the first distance, wherein respective objects of the plurality of objects are rendered differently in the alternative virtual view compared to the first virtual view.

12. A method comprising:
rendering a plurality of objects to a viewer of a scene in a first virtual view, wherein: at least one of said plurality of objects has a physical counterpart; at least one of said plurality of objects does not have a physical counterpart; and the scene is at least one of a virtual reality, augmented reality or mixed reality scene;
receiving a first command to transition from the first virtual view to an alternative virtual view, wherein the transition is configured to indicate which of the plurality of objects have a physical counterpart and which do not have a physical counterpart; and
rendering the plurality of objects in the alternative virtual view in response to the first command, wherein rendering the plurality of objects in the alternative virtual view comprises rendering at least one of the at least one object with a physical counterpart on a first two-dimensional level of the alternative virtual view and rendering at least one of the at least one object without a physical counterpart on a second two-dimensional level of the alternative virtual view that is different to the first two-dimensional level.

13. A method as claimed in claim 12, wherein:
the first two-dimensional level of the alternative virtual view is rendered closer to the viewer than the second two-dimensional level of the alternative virtual view; or
the second two-dimensional level of the alternative virtual view is rendered closer to the viewer than the first two-dimensional level of the alternative virtual view.

14. A method as claimed in claim 13, further comprising presenting background imagery of the scene on a two-dimensional level of the alternative virtual view that is rendered furthest away from the viewer.

15. A method as claimed in claim 12, further comprising presenting respective representations of one or more of the at least one object that has a physical counterpart between the first and second two-dimensional levels of the alternative virtual view.

16. A method as claimed in claim 12, wherein the first command is received from the viewer.

17. A method as claimed in claim 12, wherein rendering the plurality of objects comprises rendering the at least one object with a physical counterpart in a position dependent on a real world position of a respective physical counterpart.

18. A method as claimed in claim 12, wherein the first command is a gesture.

19. A method as claimed in claim 12, wherein the at least one object rendered on the first two-dimensional level of the alternative view is rendered at a first distance from the viewer and the at least one object rendered on the second two-dimensional level of the alternative view is rendered at a second distance from the viewer, wherein the second distance is different to the first distance.

20. A non-transitory computer readable medium comprising program instructions stored thereon which, when executed with at least one processor, causes that at least one processor to perform at least the following:
rendering a plurality of objects to a viewer of a scene in a first virtual view, wherein: at least one of said plurality of objects has a physical counterpart; at least one of said plurality of objects does not have a physical counterpart; and the scene is at least one of a virtual reality, augmented reality or mixed reality scene;
receiving a first command to transition from the first virtual view to an alternative virtual view, wherein the transition is configured to indicate which of the plurality of objects have a physical counterpart and which do not have a physical counterpart; and
rendering the plurality of objects in the alternative virtual view in response to the first command, wherein rendering the plurality of objects in the alternative virtual view comprises rendering at least one of the at least one object with a physical counterpart on a first two-dimensional level of the alternative virtual view and rendering at least one of the at least one object without a physical counterpart on a second two-dimensional level of the alternative virtual view that is different to the first two-dimensional level.

* * * * *